Sept. 24, 1957 T. KILBURN ET AL 2,807,728

DIGITAL DATA STORAGE SYSTEMS

Filed April 3, 1951 4 Sheets-Sheet 1

INVENTORS:
T. KILBURN
F.C. WILLIAMS
E.R. LAITHWAITE
BY:
Moore and Hall attys

INVENTORS:
T. KILBURN
F. C. WILLIAMS
E. R. LAITHWAITE
BY:
Moore and Hall attys

Sept. 24, 1957 T. KILBURN ET AL 2,807,728

DIGITAL DATA STORAGE SYSTEMS

Filed April 3, 1951 4 Sheets-Sheet 3

INVENTORS:
T. KILBURN
F.C. WILLIAMS
E.R. LAITHWAITE

BY:
Morse of Hall Attys

Sept. 24, 1957 T. KILBURN ET AL 2,807,728
DIGITAL DATA STORAGE SYSTEMS
Filed April 3, 1951 4 Sheets-Sheet 4
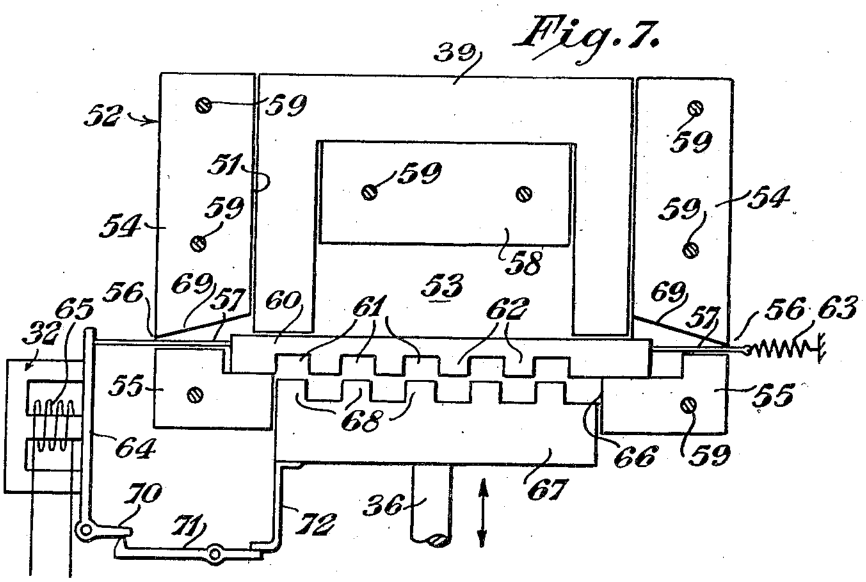
Fig. 7.
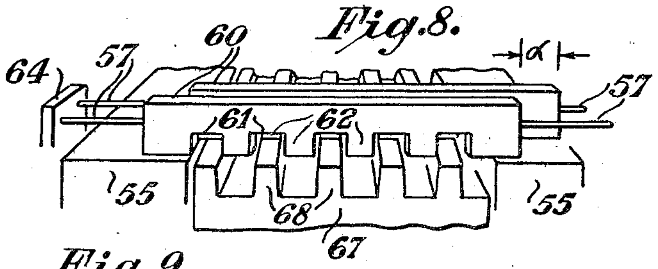
Fig. 8.
Fig. 9.
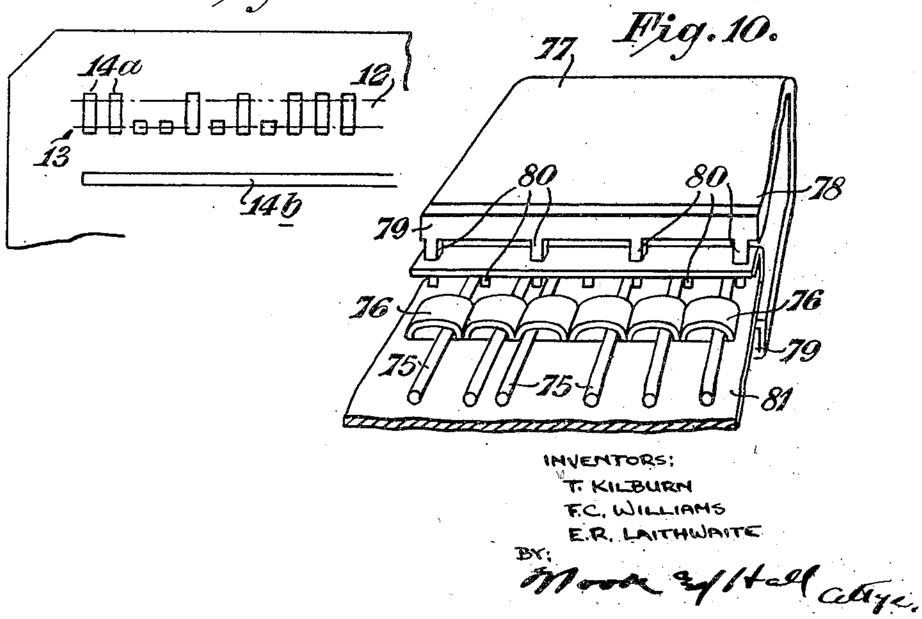
Fig. 9. Fig. 10.
INVENTORS:
T. KILBURN
F.C. WILLIAMS
E.R. LAITHWAITE
BY: Moore & Hall attys.

United States Patent Office 2,807,728

Patented Sept. 24, 1957

2,807,728

DIGITAL DATA STORAGE SYSTEMS

Tom Kilburn, Manchester, Frederic Calland Williams, Timperley, and Eric Roberts Laithwaite, Preston, England, assignors to National Research Development Corporation, London, England, a corporation of Great Britain Application April 3, 1951, Serial No. 218,924

Claims priority, application Great Britain April 5, 1950

19 Claims. (Cl. 250—219)

This invention relates to systems and apparatus for the storage of information or data, particularly in digital form, and is more particularly, although by no means exclusively, concerned with systems and apparatus for the storage of binary digital data in such a form that stored data may be readily reproduced dynamically as electric pulse train signals.

Information storage systems find a variety of applications amongst which is their use in high-speed electric computing machines. The digital storage systems employed in such machines may be roughly divided into two classes based upon their speeds of operation. In one class the speed of recording (writing) or reproducing (reading) is high, as determined by the time occupied by the expression in dynamic form of each digit by the time of access to any particular digit or group of digits forming a so-called "word" is relatively long. Such systems are of the type in which a data circulating process occurs and are typified by magnetic drum, perforated tape or delay-line storage systems. In the other class, the writing and reading speed is high and the access time is short. Such a system is the Williams' electrostatic storage system employing a cathode-ray-tube as described in the specifications of patent applications Ser. Nos. 790,879 (hereinafter referred to as specification A); 50,136 (hereinafter referred to as specification B); 124,192 (hereinafter referred to as specification C; and 93,612, now U. S. Patent 2,777,971 (hereinafter referred to as specification D).

The electrostatic and delay-line storage systems suffer from the defect that they are not permanent, the record being lost in the event of a power failure. Magnetic storage systems do not suffer from this defect but have the disadvantage that the nature of the recorded data can only be observed by dynamic reproduction of the record.

It has long been appreciated that large scale computing machines will require for their operation libraries of routines and sub-routines, i. e. lists of instructions defining programmes of operations which can be fed to the machine. Some form of permanent storage system is essential for the formation of such a library and for such purpose the time required to write data into the storage is of little consequence, the important requirement being the ability to read the stored data rapidly when necessary. The high writing speed of a magnetic system is not required for a library and punched paper tape is commonly employed as a library storage medium. The normal reading speed from paper tape, however, is low compared with the normal operating speeds of computing machines and a complex reading or conversion process is required to transfer information from paper tape to the machine. In addition the paper tape form of storage has the disadvantage that the tape is fragile and has to be loaded into the machine by hand. Any storage system which fulfills the requirements of a library will also be suitable as an input/output device whereby the data for a problem which is first recorded in permanent static form may be dynamicised and fed to a machine and the results generated by the machine in dynamic form may be recorded in permanent, visible, form.

The object of the present invention is to provide an information storage system which is capable of operation at a high reading speed and in which the record is of permanent and visible character and which is able to provide a library facility in such fashion that an item or block of stored data may be selected by means of a digital code. When such a library is used in connection with a high-speed digital computing machine the library may be operated as an integral part of the machine and access to information in the library may be directly under the control of the machine itself in terms of coded instructions which are loaded into the machine or even manufactured within such machine during its operation.

This object is obtained in accordance with the invention by employing as an information or data recording medium a plurality of thin sheets or cards upon which information is recorded as areas whose light transmitting capacity is different from other adjacent regions of the card, such cards being arranged as a stack and associated with means for moving any selected card relatively to the remainder of the stack to a position suitable for reading the information recorded thereon optically, for instance, by an optical scanning process.

Each card, which may be of a material and size suitable for storage and frequent handling, will be capable of recording a block of information, e. g. digital data, preferably disposed in a raster-like array of lines or columns. In order that the plurality of information bearing sheets, hereinafter called cards, assembled in a stack to form a library may be made readily accessible for reading, in a preferred embodiment of the invention each line or column of possible positions for the recording areas of different light transmissibility, hereinafter referred to as an "intelligence" row, has associated with it, in laterally displaced relationship, a row of further light transmitting areas, hereinafter called an "inspection" row, so that by relative movement of one, i. e. the selected, card with respect to the rest of the stack by a distance equal to the spacing distance between the "inspection" row and its associated "intelligence" row, the said intelligence row on the selected card can be read through the aligned light transmitting areas of the inspection rows of the remaining cards.

The selection and movement of a single card in the stack is made, in a preferred arrangement, according to a digital code which uniquely defines the required card so that the selection may be performed under the control of an associated computing machine by using a portion of a coded instruction word occurring during operation of the machine to operate the card selecting mechanism.

In order that the various features of the invention may be more readily understood several embodiments thereof will now be described with reference to the accompanying drawings in which:

Fig. 7 is a sectional view through part of the card selecting mechanism.

Fig. 8 is a fragmentary perspective view showing the arrangement of parts of the card selecting members of Fig. 7.

Fig. 9 is a fragmentary view showing modified card constructions.

Fig. 10 is a fragmentary perspective view of another modification.

Figures 1, 5:
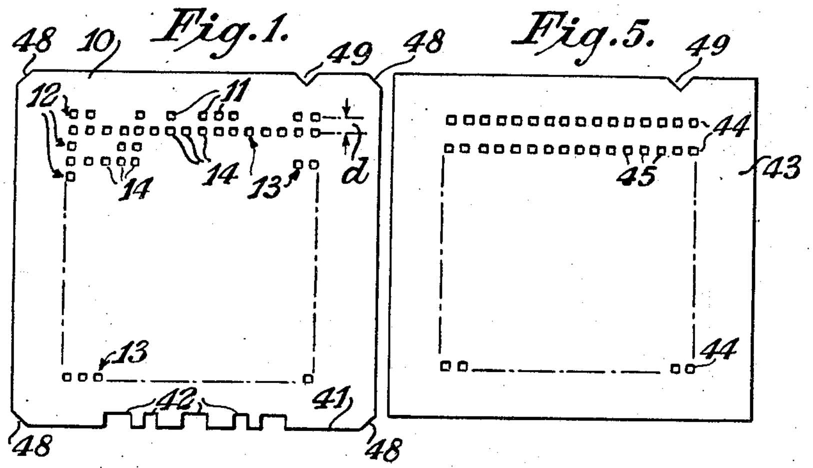
Fig. 1 is a view of a typical information-bearing card.
Fig. 5 is a view, similar to Fig. 1, of an interleave member used for stacking between adjacent information-bearing cards.

Fig. 1 illustrates one form of card according to the invention suitable for recording binary digital numbers or "words" for use with an electric digital computing machine and comprises a planar, substantially rectangular sheet 10 of thin opaque material, such as thin sheet steel or brass, cardboard, plastic sheeting or even paper mounted in a supporting framework. The digital data is recorded by means of punched-out holes 11 arranged in a raster-like pattern of a series of aligned parallel rows 12. The position of any punching along such row is determined, in the particular example shown, by the significance in the binary scale of the digit "1" which it is to represent. Thus, in the first row 12, the punchings represent the binary number 1100101011100011, and such rows 12 are accordingly hereinafter referred to as "intelligence" rows. In a practical example, suitable for use with a digital computing machine as described in detail in the specifications of patent applications Ser. Nos. 141,176, now U. S. Patent 2,755,994 (hereinafter referred to as specification E), and 165,434 (hereinafter referred to as specification F) each card will have a total of 32 intelligence rows 12, each row having 40 digit signifying positions. Such a card, accordingly, corresponds with the storage capacity of one of the cathode-ray tube electrostatic stores described in such specifications E and F.

Immediately beneath each intelligence row 12, at a predetermined and constant spacing distance *d* is provided a further or "inspection" row 13 of holes 14. In these rows 13, a hole 14 is provided at every digit-signifying position immediately below the corresponding hole position in the rows 12. In the aforesaid practical example previously referred to there are, accordingly, a total of 32 inspection rows 13 each containing 40 holes.

Figure 2:
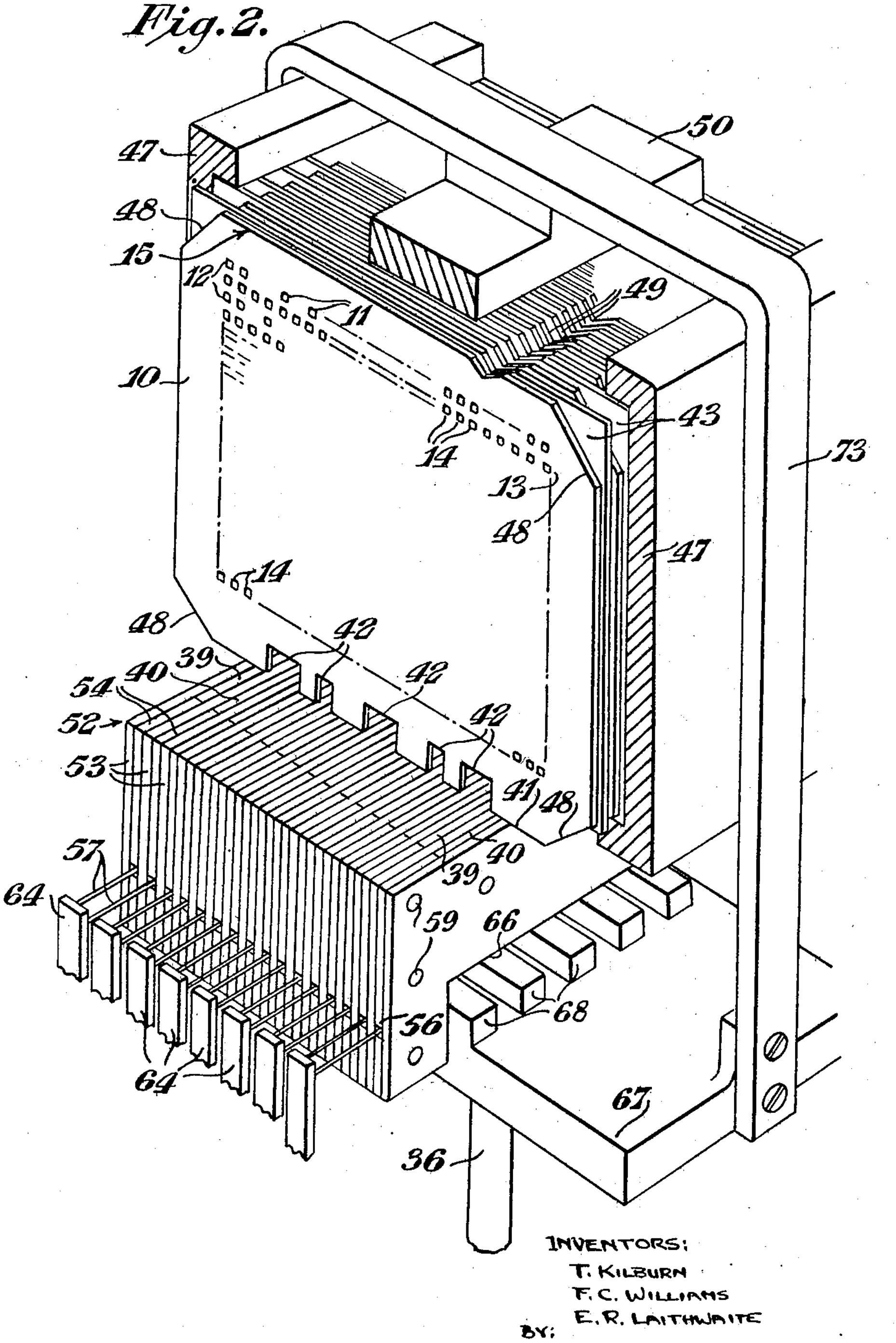
Fig. 2 is a fragmentary perspective view showing one form of card stacking and selecting arrangement.

A convenient number, say 256, of such cards 10 may be employed to record a large number, e. g. 256×32 or 8192 separate 40-digit "words" of binary data to constitute a library unit. The rows 12 and 13 and the hole locations in each row are accurately disposed to be similar on each card so that, when the plurality of cards are grouped together face-to-face in an aligned-edge stack 15 as shown in Fig. 2, each of the holes 14 in each of the inspection rows 13 will be in alignment with the related holes of the other cards and it will be possible to transmit light from one end face of the stack to the opposite end face through any and every one of the passages formed by such aligned holes. When in this position none of the intelligence rows 12 will normally be readable.

If now, any selected card of the stack 15 is lowered, relatively to the remainder of the stack, by the distance *d* i. e. the spacing distance between each intelligence row 12 and its related inspection row 13, then each of the intelligence rows 12 of that particular card will be placed in register with the aligned holes 14 of the various inspection rows 13 of the remaining cards and in consequence, each of said intelligence rows 12 of the selected card can be inspected optically by transmitting light through the inspection rows 13 from one end of the stack to the other and observing which of them permit passage of light and which do not.

Figure 3:
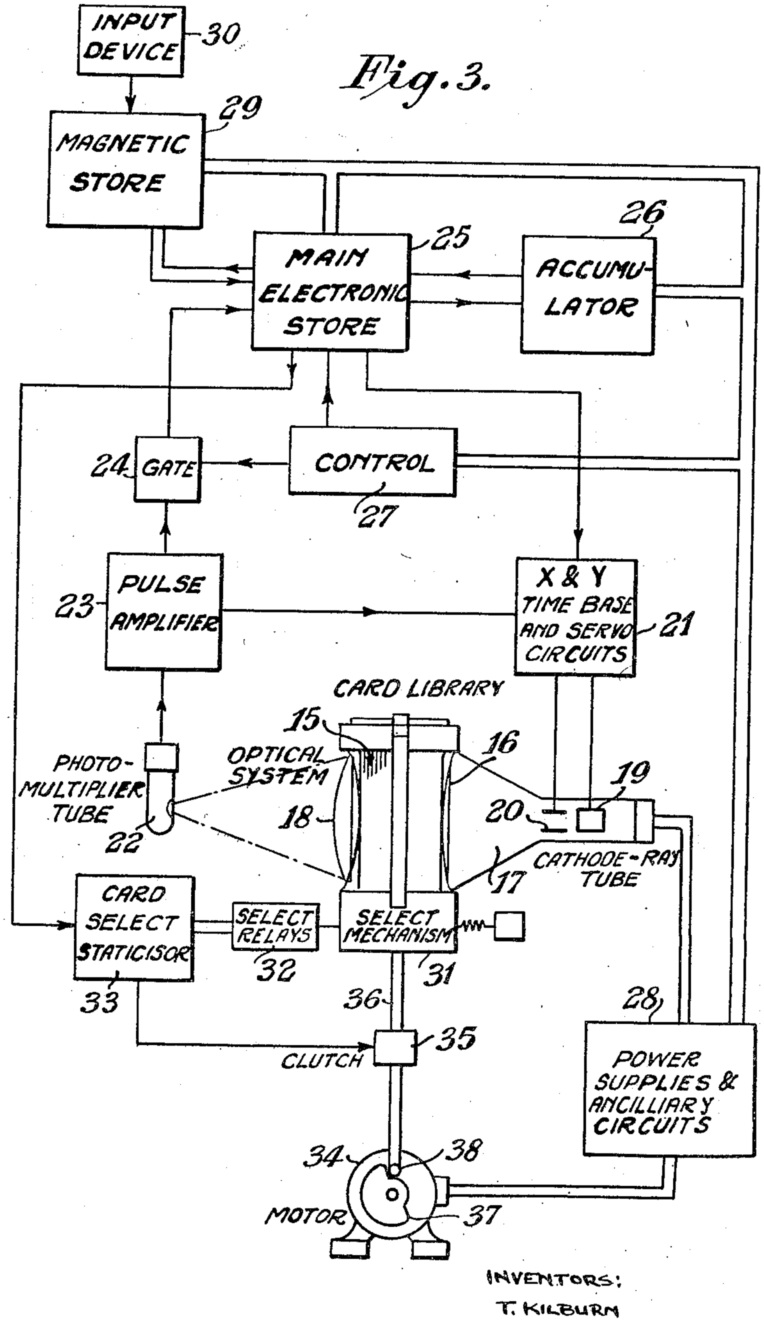
Fig. 3 is a schematic view of an information storage system according to the invention, shown in association with the principal elements of an electronic digital computing machine.

A variety of arrangements may be provided for reading the selected card intelligence rows but in the particular embodiment being described use is made of a cathode ray tube as a source of illumination and a single photocell as a sensitive viewing device. Referring to Fig. 3, which shows in schematic manner a system in accordance with the invention in operative association with an electronic digital computing machine of the kind described in said specifications E and F, the stack 15 of the cards 10 is disposed between the luminescent screen 16 of a cathode-ray tube 17 and an optical lens system 18. The beam of the cathode-ray-tube is caused to execute a raster like scanning motion so as to scan in succession a series of positions upon the screen 16 which are in precise alignment with the various inspection hole passages of the cards 10, by means of suitable deflection voltages applied to its X and Y deflecting plates 19, 20 from time-base circuits 21. The light passing through the intelligence holes 11 of the selected card of the stack 15 is concentrated by the optical system 18 on to a photocell 22. The output of the latter is a series of pulse train electric signals representing dynamically each of the separate rows or "words" of the selected card and this output, after passing through a pulse amplifier 23 and a gate circuit 24, is available as an input to the main electronic store 25 of the associated digital computing machine.

The associated digital computing machine, will be only briefly described and is one in which the main electronic store 25 includes one or more of the aforementioned Williams' type storage tube devices and is associated with an accumulator device 26, control circuits 27 and power supply arrangements and other ancillary circuits 28 as described in said specifications E and F. The main electronic store 25 is conveniently associated with a magnetic type store 29 with which is further associated an input device 30. The magnetic type store is conveniently of the rotating drum form as described in detail in the specifications of patent applications Ser. Nos. 146,446, now U. S. Patent 2,734,186 (hereinafter referred to as specification G), and 146,445, now U. S. Patent 2,652,554 (hereinafter referred to as specification H).

The selection of the required card 10 from the stack 15 may be achieved in a number of ways but in this particular embodiment is effected by means of card select mechanism 31 which wil be described in detail later, such mechanism being under the control of electromagnetic select relays 32 which, in turn, are energised in accordance with a code signal delivered from the main electronic store 25 of the associated computing machine to a card select staticisor 33. The power needed to produce the required relative movement between the selected card and the remainder of the stack is provided from a suitable source such as an electric motor 34 through a control clutch 35 which is itself operated in accordance with the controlling signals from the main store 25. The rotary motion of the motor 34 is converted into a reciprocatory motion applied to a main driving rod 36 by means of cam 37 and cam follower 38 or other equivalent arrangements.

As will be appreciated from the aforementioned specifications E and F, the scanning movement of the illuminating light spot produced upon the screen 16 of the cathode ray tube 17 must be accurately synchronized with the operating rhythm of the associated computing machine and for this purpose the time-base circuits 21 are suitably interconnected, in known manner, with the related scanning control circuits of the store 25 whereby the same digit position of the same word position is dealt with at the same time instant. For similar reasons the power supply to the motor 34 is supervised by the ancillary circuits in the power supply arrangements 28, and the clutch 35 is controlled by the main store 25, whereby the mechanical selecting movement and the subsequent restoring movement of the card stack are performed only at the right times in between the reading operations.

In the present embodiment in which the associated computing machine operated with a "scan-action" sequence as described in the aforesaid specifications E and F and in which the word selection within the main store 25 is controlled by a Y-raster generator of the kind described in the aforesaid specification D, selection of lines or rows of holes 14 of the card stack (and hence of the intelligence rows 13 of the selected card) scanned by the cathode ray tube 17 could be controlled by a similar Y-raster waveform so that any desired row 13 of the selected card 10 could be read during an "action" beat period of the machine under the control of an instruction previously given within the machine. During the intervening "scan" beat periods the beam of the cathode ray tube 17 could be blacked-out.

Figure 4:
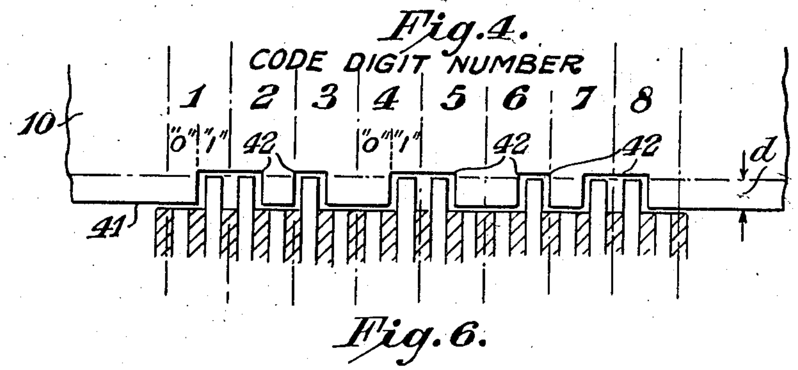
Fig. 4 is an enlarged fragmentary view of the lower edge of a card and the card selector members.

The selection of the required card 10 is effected in the arrangement shown in Fig. 2 by the use of a binary code signal which is arranged to operate upon a series of movable lifting plates 39, 40 arranged beneath the lowermost surface of the stack 15. The lower edge 41 of each information bearing card 10 is provided with (effectively) eight notches 42 as shown more clearly in Fig. 4.

These notches are arranged in positions whereby they are each opposite one or the other of the bars 39, 40 of each pair. As shown more clearly in Fig. 4 in each of the eight positions corresponding to the eight significant binary digits of the binary code signal, the associated slot is displaced to the left hand side of the centre line to signal the digit "0" or to the right hand side of the centre line to signal the digit "1." If now one or other (but not both) of the two plates 39, 40 associated with each digit position are raised according to a predetermined binary code signal, then if there are 256 information bearing cards in the stack each with a different notch arrangement according to the 256 different binary numbers which can be defined with eight binary digit places, then only one card of the stack will find the lifting plates in fully aligned relationship with its own slots 42 with the result that, as the plates are moved upwards, the whole of the stack except the selected card will be lifted.

With an arrangement as so far described, gravity is relied upon to retain the selected card in its initial lowered position and also to restore the remainder of the stack when the lifting plates are lowered again after the end of the reading operation. Such use of gravity is unsatisfactory unless the cards are heavy and precautions are taken to minimise frictional losses, for example, by providing guides or grooves for the individual cards.

In accordance with a feature of the invention, the difficulty of frictional drag between neighboring cards is avoided by interposing an interleave member 43 between adjacent information cards 10 and holding all of the sandwiched information cards and interleave members together by a light resilient pressure applied to the opposite ends of the stack.

Each interleave member 43, shown in Fig. 5, is of rectangular shape and conveniently of similar material to the cards 10. Each member is provided with complete rows 44 of inspection holes 45, identical in spacing with those of the rows 13 of the cards 10. The opposite vertical side edges 46 of the members 43 are snugly fitted within two shallow channel bars 47 which, in this embodiment, are fixed to a stationary part of the device. The transverse width of the information cards 10 is the same as that of the interleave members whereby they also are accurately positioned by the bars 47, but in order to allow the upward and downward movement of such cards, each corner thereof is chamfered as shown at 48. In order to facilitate assemblage of the stack with correct orientation of the parts, both the cards 10 and the members 43 are provided with an off-center notch 49 in their upper edges, the mutual alignment of which indicates correct positioning.

Figure 6:
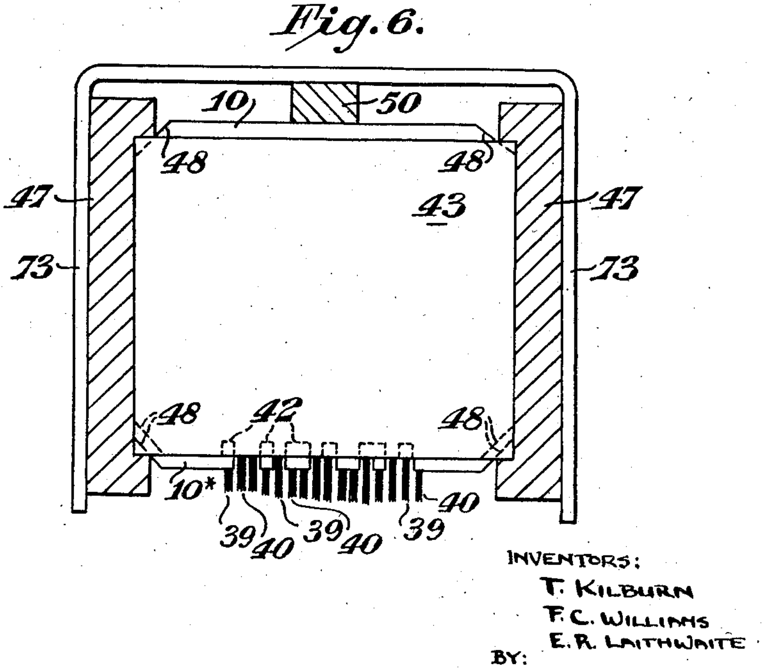
Fig. 6 is a transverse vertical section showing the cards in the selected condition.

With such arrangement, the upward displacement of all but the selected card of the stack by the lifting plates 39 or 40 brings the inspection rows 13 of the cards 10 into alignment with the similar rows 44 of the members 43 to complete the passages for viewing the intelligence rows 12 of the selected card 10. As gravity is insufficient to restore the moved cards to their initial lowered position, means in the form of a bar 50 and conveniently operated in unison with the lifting plates, is arranged to press upon the uppermost edges of the displaced cards to return them to a position flush with the upper edges of the members 43 and the unmoved, selected, card 10. Fig. 6 illustrates the relative positions of the parts during the information reading operation, the selected card being shown at 10.

Constructional details of the operating mechanism of the lifting plates 39, 40 is illustrated more clearly in Figs. 2, 7 and 8 from which it may be seen that each lifting plate 39 or 40 is in the form of a thin inverted U-shaped plate sliding vertically within an aperture 51 formed in a series of stacked laminae 52.

The laminae stack 52 comprises alternate whole plates 53 and interposed spacing strips 54, 55 along each vertical edge, the latter strips being slightly separated at their adjacent ends to define a narrow gap 56 through which pass thin wires 57. A series of middle plates 58 located within the central space of the U-shaped lifting plates 39, 40 provide a resting stop for the latter with their uppermost edges flush with the upper surface of the laminae stack 52. The assemblage of laminae is held together by transverse rods or bolts 59 and like the channel bars 47, is rigidly, secured to the fixed framework of the device.

Immediately beneath the lowermost ends of each lifting plate 39, 40 is disposed a sliding abutment piece 60 in the form of a bar resting at its ends upon surfaces formed on the strips 55 and provided along its undersurface with a series of spaced slots 61 forming intervening projections 62. The wires 57 are connected to each end of each piece 60, the wires projecting from one side of the laminae stack 52 being anchored through tension springs 63 to a fixed part of the device and those projecting from the other side being coupled to the ends of pivoted armatures 64 of electro-magnets 32 whose energising windings 65 are supplied with current under the control of the card select staticisor 33, Fig. 3. Each armature 64 is connected to the respective abutment pieces 60 which lie beneath the pair of lifting plates 39 and 40 which deal with one of the card selection code digits.

As shown more clearly in Fig. 8, the respective abutment pieces 60 coupled to each armature are longitudinally displaced with respect to one another by the distance $\alpha$ so that the notches 61 of one piece lie opposite the projections 62 of the other and vice versa.

Operating in a channel 66 in the undersurface of the laminae stack 52 is a driving stirrup 67 whose upper surface is ribbed to provide a series of projections 68 suitably shaped and spaced to enter into the notches 61 of any piece 60 when the latter is appropriately positioned thereover. This stirrup is rigidly coupled to the upper end of the main driving rod 36 to be reciprocated up and down by the latter at appropriate card selecting and reading times.

Owing to the longitudinal staggering of the respective notches 61 of the pair of abutment pieces 60 associated with each armature 64, only one of such pieces 60 can be positioned at any one time so that the slots 61 thereof lie opposite the projections 68 on the stirrup 67 with the result that, when the relay magnet 32 is de-energised, the abutment piece 60 beneath the lifting plate 39 will be lifted to raise such plate whereas when the magnet is energised the other piece 60 beneath the lifting plate 40 will be lifted to raise the latter. The sloping lower edges 69 of the strips 54 permit the necessary flexing of the wires 57.

In order to relieve the relay magnets 32 of the task of moving both abutment pieces 60 against the tension of the springs 63, each armature 64 is provided with a tail 70 which is engageable by one end of a pivoted two-armed lever 71 whose opposite limb is operated upon by a striking plate 72 secured to the stirrup 67. When the latter is in its lower, inactive, position prior to card selection and card reading, all the armatures are mechanically moved into contact with their respective magnets. Energisation of the appropriate relay magnets in accordance with the binary code number of the required card is arranged to take place before operation of the clutch 35 (Fig. 3) with the result that, as the stirrup 67 begins to rise, only the armatures 64 of those magnets which are still deenergised fall back to cause raising of the lifting plates 39, the energised magnets serving to hold the armatures to cause raising of the lifting plates 40.

The card resetting bar 50 is rigidly connected by means of frame 73 to opposite sides of the stirrup 67 as shown in Fig. 2 whereby such bar is lifted in unison with the lifting plates to allow upward movement of the unselected cards and is subsequently lowered in unison with such lifting plates after reading is completed to restore the displaced cards to their original positions in readiness for the next selection and reading operation.

An alternative form of information card is shown in Fig. 9 in which the intelligence rows 12 are formed by extending the related hole **14*a* of the adjacent inspection row 13. Such a method of recording is somewhat more convenient to manufacture than the separate hole formation previously described. In another alternative, illustrated also in Fig. 9, the inspection holes may be combined as a single slot as shown at 14*b***. The inspection holes or slots may conveniently be somewhat larger than the associated intelligence holes in order to increase the permissible tolerance of manufacture and operation. Preferably the intelligence holes are square in shape as shown but they may be round or of other shape.

A variety of modifications may obviously be made without departing from the scope of the invention. For example, the required recording upon the card members may be effected photographically in which case the holes of the arrangement described will be replaced by patches of transparent or translucent character upon a background area of opaque or relatively poor light transmitting capacity. Obviously, a reversed arrangement could also be utilised in which the information data was recorded as areas of opaque character in zones which are otherwise of good light transmitting capacity. In this case however, which is not normally so convenient, the inspection rows will still be of good light transmitting capacity upon an opaque ground.

An alternative form of card selector is shown in Fig. 10, in which only one movable member, in the form of a rod 75 is used for each digit-significant position of the card selecting code signal and such bar is displaced laterally into either a "0" significant or a "1" significant position by means under the control of the associated machine. In the example shown in this figure each rod 75 is of magnetisable metal and is surrounded at its opposite ends by energising windings 76 whereby it may be longitudinally magnetised in either of two opposite polarities. Associated with each end of each of the bars is a C-section permanent magnet 77 to the opposing pole tips 78 of which are secured inwardly directed pole pieces 79 of toothed form, the respective teeth 80 being alternated as shown and positioned to form stops for arresting the lateral movement of the rods 75. The rods 75 are arranged to slide or roll on a non-magnetic platform 81. According to the particular mode of energisation of the coil 76 associated with each rod 75 so the latter will be polarised to move into attractive contact with the oppositely poled extension tooth 80 of the associated permanent magnet. The whole assembly can be arranged for reciprocation by the main driving rod 76 as before.

Instead of arranging for the upward movement by mechanical power of each of the card selector rods or plates and causing the displacement of the unselected cards thereby, it is possible in another alternative to arrange that the stack of cards and their interleaves are reciprocated by applying the reciprocating motion to the channel bars 47 of a construction similar to Fig. 2. In this case the card selector plates or rods are maintained stationary after their setting movement and only the selected card partakes of the full displacement applied to the interleave cards, the remainder of the card being arrested by contact with one or other of the selector bars to produce the required relative dsiplacement in the manner as previously described.

If desired the card selecting means may be duplicated, one at each side of the central line of the cards so as to provide a more balanced thrust upon the latter in those cases where only one or two of the selecting elements differs in its setting from that of the card notches formation.

The disposition of the card selecting slots or notches in the lower edges of the cards is not essential. They can be arranged along each side edge or along the upper edge or even within the area of the cards. In this latter embodiment the slots are conveniently of L or J form with selector rods threaded therethrough and movable horizontally to left or right in accordance with the binary digit significance.

Instead of using a light source which executes a scanning motion as described, a constant light source may be used and the scanning effected at the light receiving end of the various inspection hole passages. For this purpose a rotating, e. g., Nipkow disc or a rotating mirror stack may be used.

By suitable increase of the number of digit positions in the selection code signal an increased number of cards may be handled. For instance, by using a 12-digit code a total of 4096 cards may each be given a unique selection slot formation. The stacking facilities need not be sufficient to contain all of this increased number of cards since any desired selection of, say, 256 cards, may be inserted without regard to their order or relationship to one another and read, as required, by applying the appropriate selection code signal.

Although the invention has been described more particularly with relation to the storage of binary numbers in conjunction with a binary digital computing machine, it will be obvious that the basic principles of the invention are capable of much wider application. For example, written or printed matter may be recorded photographically and inspected through adjacent inspection slots or their equivalent clear areas.

We claim:

1. Information storage system comprising a plurality of planar cards arranged in face-to-face stacked relationship, each of said cards having information recorded thereon as areas whose light transmitting capacity is different from that of the other adjacent regions of the card, optical scanning means for inspecting said information bearing areas of any one of said cards and card selecting means for moving any selected card relatively to the remainder of the stack to a position where said information bearing areas can be inspected by said optical scanning means and then returning said card to its original position in said stack, said card selecting means comprising a plurality of movable selector members engageable with an edge region of the cards in said stack, separate electromagnetic operating means for moving each of said selector members between a first and a second position and said cards each being provided on said edge region engageable by said selector members with a uniquely distinctive arrangement of slots for cooperation with said movable selector members whereby with any selection of positions of said selector members not more than one card of said stack will present a slot therein to each of said selector members.

2. Information storage system comprising a plurality of planar cards arranged in face-to-face stacked relationship, each of said cards having information recorded thereon as areas whose light transmitting capacity is different from that of the other adjacent regions of the card, optical scanning means for inspecting said information bearing areas of any one of said cards and card selecting means for moving any selected card relatively to the remainder of the stack to a position where said information bearing areas can be inspected by said optical scanning means and then returning said card to its original position in said stack, said card selecting means comprising a plurality of liftable selector members disposed beneath the lower edges of the cards of said stack, electromagnetic lifting means for each of said selector means, notches in the lower edge of each of said cards disposed opposite to selected ones of said selector members, the notches of each card being uniquely arranged in accordance with a binary code selection signal representative of said card and signal control means connected to said electromagnetic lifting means for selectively energising appropriate ones of said lifting means in accordance with the nature of a binary code signal whereby all the cards of the stack except that one which has a notch formation suitable for receiving each of the raised lifting members are raised.

3. Information storage system according to claim 2 which comprises a mounting carrier for said cards of said stack, said mounting carrier including friction grip means holding each card in frictional engagement with said carrier.

4. Information storage system according to claim 3 wherein said friction grip means comprises an interleave member between each adjacent pair of cards, said interleave members being each coupled to said mounting carrier for movement in unison therewith.

5. Information storage system according to claim 2 which comprises mounting means for said cards of said stack, said mounting means providing gravity control for each card whereby the raised cards return to their lowered position upon lowering of the raised lifting members.

6. Information storage system comprising a plurality of planar cards arranged in face-to-face stacked relationship, each of said cards having information recorded thereon as areas whose light transmitting capacity is different from that of the other adjacent regions of the card, optical scanning means for inspecting said information bearing areas of any one of said cards and card selecting means for moving any selected card relatively to the remainder of the stack to a position where said information bearing areas can be inspected by said optical scanning means and then returning said card to its original position in said stack, said card selecting means comprising a plurality of movable selector members engageable with an edge region of the cards in said stack, separate electromagnetic operating means for moving each of said selector members between a first and a second position and said cards being each provided on said edge region engageable by said selector members with a unique arrangement of slots for cooperation with said movable selector members whereby with any selection of positions of said selector members not more than one card of said stack will present a slot therein to each of said selector members, a stationary mounting carrier for said stack of cards, interleave members between each adjacent pair of cards, said interleave members being coupled to said carrier and reciprocating support means for said movable selector members, said support means being movable in a direction at right angles to the slotted edges of said cards whereby all but the card having an edge slot formation conforming to the selected positions of said selector members will be moved relatively to said interleave members and said mounting carrier upon movement of said reciprocating support means towards said stack.

7. Information storage system comprising a plurality of planar cards arranged in face-to-face stacked relationship, each of said cards having information recorded thereon as areas whose light transmitting capacity is different from that of the other adjacent regions of the card, optical scanning means for inspecting said information bearing areas of any one of said cards and card selecting means for moving any selected card relatively to the remainder of the stack to a position where said information bearing areas can be inspected by said optical scanning means and then returning said card to its original position in said stack, said card selecting means comprising a plurality of movable selector members engageable with an edge region of the cards in said stack, separate electromagnetic operating means for moving each of said selector members between a first and a second position and said cards being each provided on said edge region engageable by said selector members with a unique arrangement of slots for cooperation with said movable selector members whereby with any selection of positions of said selector members not more than one card of said stack will present a slot therein to each of said selector members, a reciprocating carrier for said stack of cards, friction interleave members between each adjacent pair of cards, said interleave members being carried by said reciprocating carrier for conjoint movement therewith and said carrier being movable in a direction to present the slotted edges of said cards to said movable selector members whereby only that card having an edge slot formation conforming to the selected positions of said selector members will be permitted to undergo the full extent of movement of said carrier towards said selector members.

8. Information storage system according to claim 2 wherein said card selecting means comprises a plurality of liftable selector members formed as plates in side-by-side relationship, a common power operated reciprocating member below said selector plates and a plurality of movable abutments one for each selector plate and each shiftable between a first position where it is effective as a motion transmitting element between said reciprocating member and said plate and a second position where it is ineffective to transmit such reciprocating motion and electromagnetic means for controlling the position of each abutment.

9. In an electronic digital computing machine operating in the serial mode with number and instruction data words represented by electric pulse signal trains and with a rhythm comprising a plurality of minor cycles each of a time duration suitable for expressing a word of a predetermined number of digits in length, an information storage device comprising a plurality of planar cards arranged in stacked relationship, each of said cards having a plurality of machine data words recorded thereon as areas whose light transmitting capacity is different from that of the other adjacent regions of the cards, each of said data word recordings comprising a plurality of information recording areas, one for each digit position of the word, arranged in a row and there being a series of such rows in parallel relationship and with similar recording areas in aligned positions on each of the cards and each of said cards being provided with regions of good light transmitting capacity in a common and predetermined parallel spaced relationship to each of said word recording rows, card selecting means controlled by an electric signal from said computing machine for displacing any chosen one of said stacked cards relatively to the remaining cards of the stack to bring the word recording rows thereof opposite the related and aligned good light transmitting regions of the remaining cards, a movable source of light at one end of said stack for illuminating sequentially each of the light transmitting areas of any one row of the remaining stack of cards in time synchronism with a minor cycle of said machine, optical viewing means at the opposite end of said stack for determining at which of said areas of the row light is transmitted throughout the thickness of said stack and electric pulse signal generating means for providing an output signal pulse in response to each instance of light transmission through said stack to constitute a word-representing signal for said computing machine.

10. In an electronic digital computing machine operating in the serial mode with number and instruction data words represented by electric pulse signal trains, an information storage system comprising a plurality of planar cards of non-magnetic material arranged in face-to-face stacked relationship, each of said cards having information recovered thereon as areas whose light transmitting capacity is different from that of the other adjacent regions of the card, a cathode ray tube, beam deflecting means for constraining the beam of said cathode ray tube to execute a scanning motion across the tube screen to produce illumination of the later sequentially at positions which register with each of the possible positions of said information bearing areas of a card presented to said cathode ray tube screen, card selecting means for moving any selected card relatively to the remainder of the stack to a position where said information bearing areas are illuminated by light from said illumination positions on said cathode ray tube screen and then returning said card to its original position in said stack, said card selecting means comprising a plurality of liftable selector members disposed beneath the lower edges of the cards of said stack, electromagnetic lifting means for each of said selector means, notches in the lower edge of each of said cards disposed opposite to selected ones of said selector members, the notches of each card being uniquely arranged in accordance with a binary code selection signal representative of said card and signal controlled means connected to said electromagnetic lifting means for selectively energising appropriate ones of said lifting means in accordance with the nature of a binary code signal from said computing machine whereby all the cards of the stack except that one which has a notch formation suitable for receiving each of the raised lifting members are raised and means for deriving a word-representing pulse signal train for use in said computing machine from the illumination of said information bearing areas of said selected card by said cathode ray tube beam.

11. In an electronic digital computing machine operating in the serial mode with number and instruction data words represented by electric pulse signal trains, an information storage system comprising a plurality of planar cards arranged in face-to-face stacked relationship, each of said cards having information recorded thereon as areas whose light transmitting capacity is different from that of the other adjacent regions of the card, a cathode ray tube having its fluorescent screen positioned adjacent one end face of the stack, beam deflecting means for constraining the beam of said cathode ray tube to execute a scanning motion across the tube screen to produce illumination of the latter at positions in alignment with each of the possible positions of said information bearing areas of a card in turn, optical viewing means at the opposite end of said stack for determining whether light is transmitted through the selected card, card selecting means for moving any selected card relatively to the remainder of the stack into a position where said information bearing areas thereof are illuminated by light from said cathode ray tube and then returning said card to its original position in said stack, said card selecting means comprising a plurality of liftable selector members disposed beneath the lower edges of the cards of said stack, electromagnetic lifting means for each of said selector means, notches in the lower edge of each of said cards disposed opposite to selected ones of said selector members, the notches of each card being uniquely arranged and signal controlled means operable by a signal from said computing meachine and connected to said electromagnetic lifting means for selectively energising appropriate ones of said lifting means in accordance with the notch arrangement of the required card whereby all the cards of the stack except that one which has a notch formation suitable for receiving each of the raised lifting members are raised and means for deriving a word-representing pulse signal train from said viewing means for use in said computing machine.

12. In an electronic digital computing machine operating in the serial mode with number and instruction data words represented by electric pulse signal trains, an information storage system comprising a plurality of planar cards arranged in face-to-face stacked relationship, each of said cards having information recorded thereon as areas whose light transmitting capacity is different from that of the other adjacent regions of the card, said information bearing areas being arranged in similar positions on each card as a series of parallel rows and each card being provided also adjacent to each of said parallel rows and in a common predetermined parallel spaced relationship with a region of good light transmitting capacity, a cathode ray tube having its fluorescent screen adjacent one end face of the stack, beam deflecting means for constraining the beam of said cathode ray tube to execute a raster scanning motion across the tube screen to produce illumination of the latter at positions in alignment with each of the rows of information bearing areas in turn, optical viewing means at the opposite end of said stack for determining whether light is transmitted through the thickness of the stack, card selecting means for moving any selected card relatively to the remainder of the stack to a position where said information bearing areas can be inspected by said optical scanning means through the aligned areas of good light transmitting capacity of the remaining cards and then returning said card to its original position in said stack, said card selecting means comprising a plurality of liftable selector members disposed beneath the lower edges of the cards of said stack, electromagnetic lifting means for each of said selector means, notches in the lower edge of each of said cards disposed opposite to selected ones of said selector members, the notches of each card being uniquely arranged in accordance with a binary code selection signal representative of said card and signal controlled means connected to said electromagnetic lifting means for selectively energising appropriate ones of said lifting means in accordance with the nature of a binary code signal from said computing machine whereby all the cards of the stack except that one which has a notch formation suitable for receiving each of the raised lifting members are raised and means for deriving a word-representing pulse signal train from said optical viewing means for use in said computing machine.

13. In an electronic digital computing machine operating in the serial mode with number and instruction data words represented by electric pulse signal trains, an information storage system comprising a plurality of planar cards arranged in face-to-face stacked relationship, each of said cards being opaque and having information recorded thereon as discrete areas of good light transmitting capacity, said information recording areas being arranged to occupy selected positions out of a plurality of spaced data defining locations in each of a series of parallel information rows which are in similar positions on each card and each of said cards being provided also with an inspection region of good light transmitting capacity in a common and predetermined parallel spaced relationship to each of the data-defining locations of each of said information rows, a cathode ray tube having its fluorescent screen positioned adjacent one end face of the stack, beam deflecting means for constraining the beam of said cathode ray tube to execute a raster scanning motion across the tube screen to produce illumination of the latter at positions in alignment with each of the information rows of the cards in turn, optical viewing means at the opposite end of said stack for determining whether light is transmitted through the thickness of the stack, card selecting means for moving any selected card relatively to the remainder of the stack to a position where said information bearing areas can be inspected by said optical scanning means through the aligned rows of inspection regions of the remaining cards and then returning said card to its original position in said stack, said card selecting means comprising a plurality of liftable selector members disposed beneath the lower edges of the cards of said stack, electromagnetic lifting means for each of said selector means, notches in the lower edge of each of said cards disposed opposite to selected ones of said selector members, the notches of each card being uniquely arranged to be representative of said card and means controlled by said computing machine and connected to said electromagnetic lifting means for selectively energising appropriate ones of said lifting means in accordance with the notch configuration of the required card whereby all the cards of the stack except that one which has a notch formation suitable for receiving each of the raised lifting members are raised and means for deriving a word-representing pulse signal train from said optical viewing means for use in said computing machine.

14. In an information storage system comprising a plurality of planar cards arranged in face-to-face stacked relationship, card selecting means for causing displacement of any one selected card of said stack relatively to the remainder of the stack comprising a plurality of pairs of movable selector members, said selector members being disposed adjacent one side surface of said stack in parallel planes which are at right angles to the said side surface of the stack and at right angles to the individual card planes, a reciprocating member arranged for operation in a direction normal to said side surface of said stack, a plurality of movable abutment pieces between said selector members and said reciprocating member, electric signal controlled means for interposing a different one of said abutments between said reciprocating member and one or the other of each of said pairs of selector members to transmit motion of said reciprocating member towards said stack to said selector members and notches in the edge of each of said cards forming said side of said stack, said notches being positioned opposite to selected ones of said movable selector members, the notches of each card being uniquely arranged to be representative of said card whereby all of said cards except the required card, which has a notch formation suitable for receiving each of the moved selector members, are moved by the movement of said reciprocating member towards said stack.

15. In an information storage system comprising a plurality of planar cards arranged in face-to-face stacked relationship, card selecting means for causing displacement of any one selected card of said stack relatively to the remainder of the stack comprising a plurality of pairs of liftable selector members disposed beneath the lower edges of the cards of said stack, a reciprocating member operating in an upward and downward direction beneath said stack, a plurality of movable abutments between said selector members and said reciprocating member, electric signal controlled means for interposing a different one of said abutments between said reciprocating member and one or the other of each of said pairs of selector members to transmit upward motion of said reciprocating member to said selector member and notches in the lower edge of each of said cards disposed opposite to selected ones of each of said pairs of liftable selector members, the notches of each card being uniquely arranged to be representative of said card whereby all of said cards except the required card, which has a notch formation suitable for receiving each of the raised selector members, are lifted by the upward movement of said reciprocating member.

16. Card selector mechanism for moving one chosen card of a stack of aligned cards to a position where such selected card is displaced relatively to the remaining cards and comprising a reciprocating member disposed adjacent one side surface of said stack for reciprocating movement in a direction normal to such side surface, a plurality of movable card selector members arranged in side-by-side relationship between said side surface of said stack and said reciprocating member in directions transverse to the adjacent edges of said cards, a movable abutment between each of said movable card selector members and said reciprocating member, said abutments being each movable between a first position where it does not transmit motion of said reciprocating member towards said stack to its associated selector member and a second position where the reciprocating movement of said member is transmitted to said selector member, electric signal controlled means for moving appropriate ones of said abutment members into their first position and the remaining abutments into their second position and notches on the edge of each of said cards forming said side surface of said stack, said notches being disposed opposite to selected ones of said selector members with the notches of said card uniquely arranged to be representative of that card whereby all of said cards of said stack except the selected card are moved by the operation of said reciprocating member through said selector members to displace such cards relative to the selected card.

17. Card selector mechanism for moving one chosen card of a stack of aligned record cards to a position where such selected card is displaced relatively to the remaining cards and comprising a plurality of interleave cards, one between each pair of adjacent record cards, means for holding said interleave cards stationary against movement in any direction coincident with the plane thereof, a reciprocating member disposed adjacent one side surface of said stack for reciprocating movement in a direction normal to such side surface, a plurality of movable card selector members arranged in side-by-side relationship between said side surface of said stack and said reciprocating member in directions transverse to the adjacent edges of said record cards, a movable abutment between each of said movable card selector members and said reciprocating member, said abutments being each movable between a first position where it transmits motion of said reciprocating member towards said stack to its associated selector member and a second position where the reciprocating movement of said member is not transmitted to said selector member, electric signal controlled means for moving appropriate ones of said abutment members into their first position and the remaining abutments into their second position and notches on the edge of each of said record cards forming said side surface of said stack, said notches being disposed opposite to selected ones of said selector members with the notches of each record card uniquely arranged to be representative of that record card whereby all of said record cards of said stack except the selected record card are moved by the operation of said reciprocating member through said selector members to displace such record cards relative to the selected record card.

18. Card selector mechanism for moving one chosen card of a stack of aligned record cards to a position where such selected card is displaced relatively to the remaining cards and comprising a plurality of interleave cards, one between each pair of adjacent record cards, means for holding said interleave cards stationary against movement in any direction coincident with the plane of such card, a reciprocating member disposed adjacent one side surface of said stack for reciprocating movement in a direction normal to such side surface, a plurality of movable card selector members arranged in side-by-side relationship between said side surface of said stack and said reciprocating member in directions transverse to the adjacent edges of said record cards, a separate movable abutment between each of said movable card selector members and said reciprocating member, said abutments being each movable between a first position where it transmits motion of said reciprocating member towards said stack to its associated selector member and a second position where the reciprocating movement of said member is not transmitted to said selector member, electric signal controlled means for moving appropriate ones of said abutment members into their first position and the remaining abutments into their second position, notches on the edge of each of said record cards forming said side surface of said stack, said notches being disposed opposite to selected ones of said selector members with the notches of each record card uniquely arranged to be representative of that record card whereby all of said record cards of said stack except the selected record card are displaced by the movement of said reciprocating member towards said stack through the intermediary of said selector members to displace such record cards relative to the selected card and a return pressure plate disposed at the side of said stack opposite to said reciprocating member, said return pressure plate being interconnected with said reciprocating member to return said displaced record cards to their original position upon return movement of said reciprocating member away from said stack.

19. An arrangement according to claim 17 in which said reciprocating member includes a head having a plurality of spaced parallel grooves at right angles to the planes of the cards of said stack and in which said abutment means each comprises a bar disposed at right angles to said grooves, each of said bars having a surface facing said head which includes a plurality of notches complementary to said grooves of said head member.

References Cited in the file of this patent

UNITED STATES PATENTS

| | | |
|---|---|---|
| 2,294,720 | Dickinson | Sept. 1, 1942 |
| 2,382,055 | Homrighous | Aug. 14, 1945 |
| 2,402,058 | Loughren | June 11, 1946 |
| 2,448,830 | Robbins et al. | Sept. 7, 1948 |
| 2,495,790 | Valensi | Jan. 31, 1950 |
| 2,523,328 | Ranks | Sept. 26, 1950 |
| 2,541,247 | Herr | Feb. 13, 1951 |
| 2,558,577 | Myers | June 26, 1951 |
| 2,668,877 | Gent et al. | Feb. 9, 1954 |